May 7, 1929.                H. L. STEPHENSON                1,711,660
                            VALVE OPERATION SYSTEM
                       Filed April 30, 1927        3 Sheets-Sheet 1
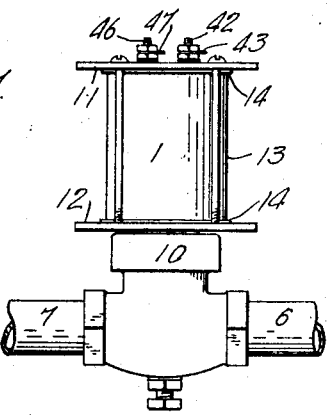
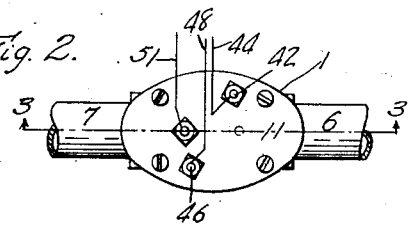
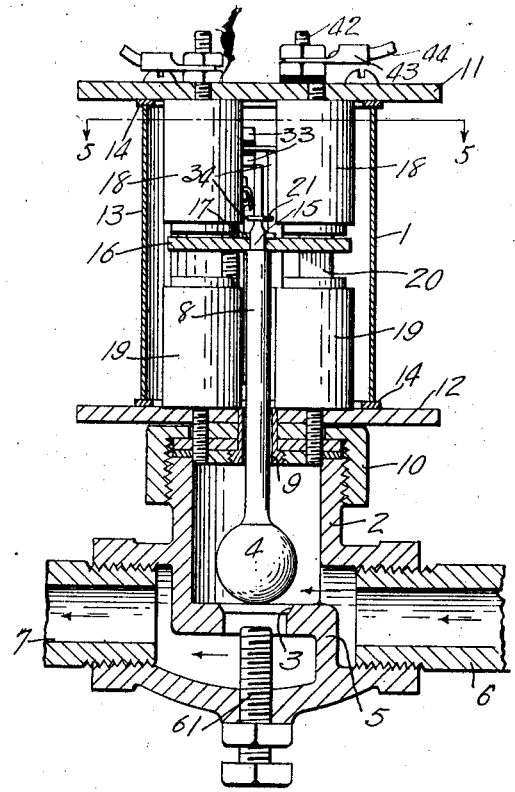
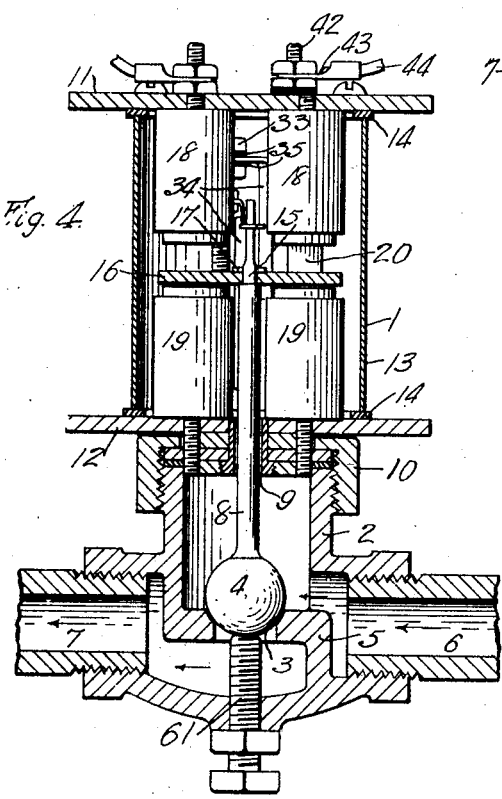
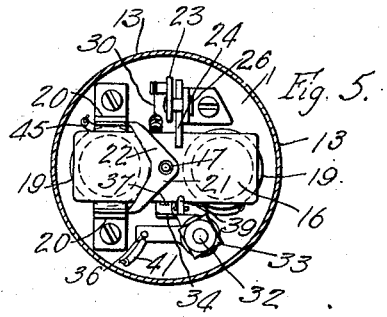
INVENTOR.
Henry L. Stephenson
by Parker & Prochnow
ATTORNEYS May 7, 1929.   H. L. STEPHENSON   1,711,660
VALVE OPERATION SYSTEM
Filed April 30, 1927   3 Sheets-Sheet 2
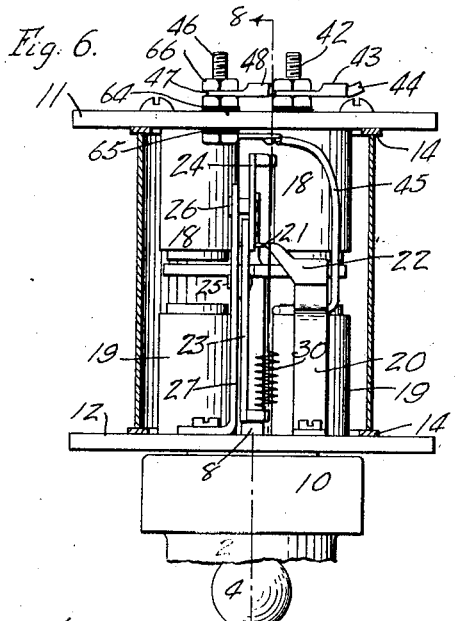
Fig. 6.
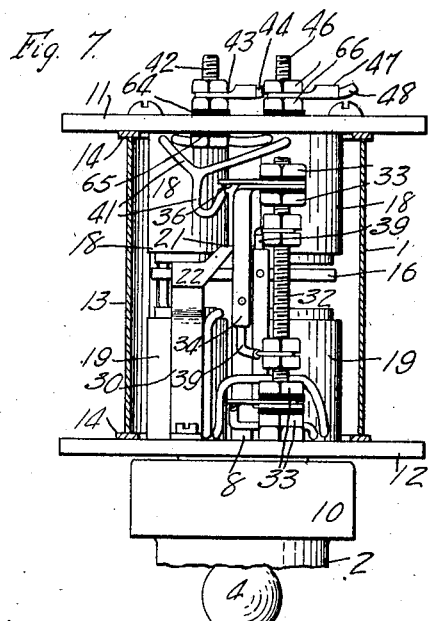
Fig. 7.
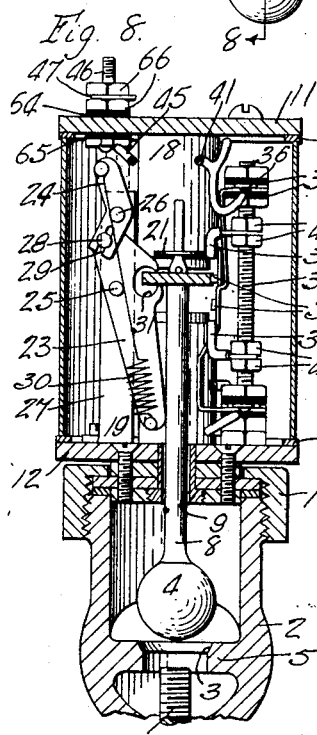
Fig. 8.
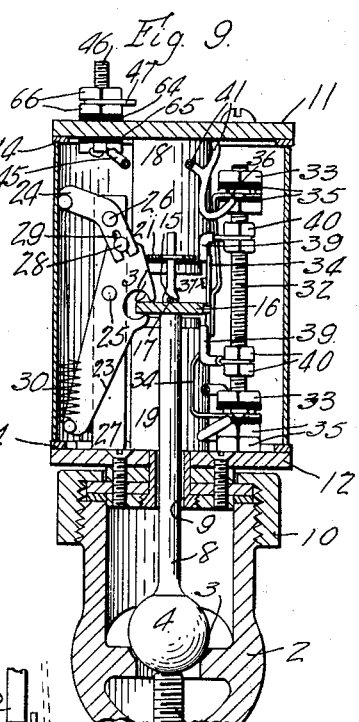
Fig. 9.
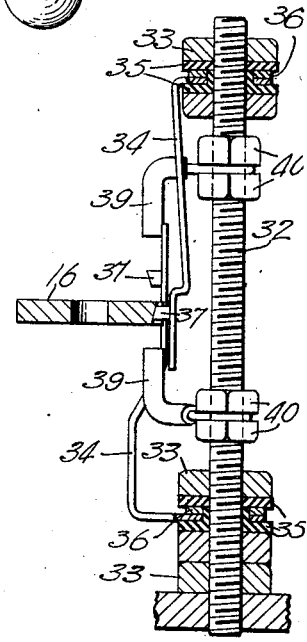
Fig. 10.
Fig. 11.
INVENTOR.
Henry L. Stephenson
by Parker & Prochnow
ATTORNEYS.

May 7, 1929.  H. L. STEPHENSON  1,711,660
VALVE OPERATION SYSTEM
Filed April 30, 1927   3 Sheets-Sheet 3
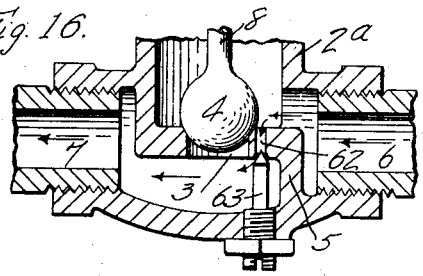
Fig. 16.
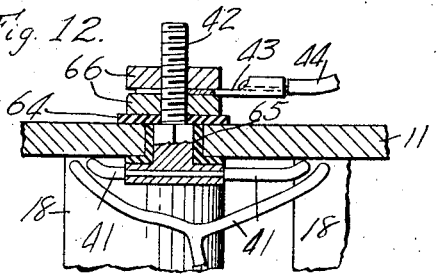
Fig. 12.
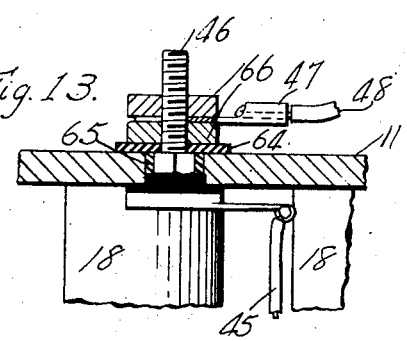
Fig. 13.
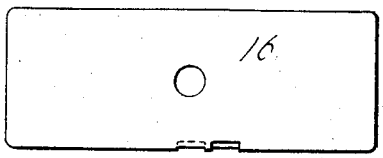
Fig. 14.
Fig. 15.
INVENTOR.
Henry L. Stephenson
by Parker & Prochnow
ATTORNEYS.

Patented May 7, 1929.

1,711,660

UNITED STATES PATENT OFFICE.

HENRY L. STEPHENSON, OF BUFFALO, NEW YORK.

VALVE-OPERATION SYSTEM.

Application filed April 30, 1927. Serial No. 187,816.

This invention relates to valves and systems for operating the same between open and closed positions. More particularly it relates to an electrical system for operating a valve, such as a gas valve, between open and closed positions, which systems are particularly useful in connection with domestic water supply heating devices in homes. Such an electrical operation of valves permits control of water heating burners, for example, from different parts or rooms of a house, and thus renders unnecessary any trips by a person to the basement of a house to light or extinguish the water heating burner.

An object of this invention is to provide an improved and simplified operating system for valves by which dependable and certain operation of a valve from remote points may be obtained.

A further object of the invention is to provide an improved electric operating system for valves with which the operating force required will be a minimum at the start of each operation; with which the valve will be yieldingly biased into both open and closed positions, and which will be dependable in operation and relatively simple, durable and inexpensive in construction.

A further object of the invention is to generally improve and simplify the operating mechanism of a valve of this type, to the end that a more satisfactory and dependable valve operation may be obtained.

Various other objects and advantages will be apparent from the following description of an embodiment of the invention, and the novel features will be particularly pointed out hereinafter in connection with the appended claims.

In the accompanying drawing:—

Fig. 1 is a side elevation of a gas valve electrically operated between open and closed positions in accordance with this invention;

Fig. 2 is a plan of the same;

Fig. 3 is a sectional elevation of the same on a larger scale, the section being taken approximately along the line of 3—3 of Fig. 2, and the valve being in open position;

Fig. 4 is a similar elevation, but with the valve in its closed position;

Fig. 5 is a sectional plan of the operating mechanism of the valve, the section being taken approximately along the line 5—5 of Fig. 3, but with the upper magnets removed;

Fig. 6 is a side elevation of the valve operating mechanism, with the casing in section to show the interior mechanism;

Fig. 7 is an elevation similar to Fig. 6, but showing the side opposite from that shown in Fig. 6;

Fig. 8 is a sectional elevation of the same, with the section taken approximately along the line 8—8 of Fig. 6;

Fig. 9 is a similar elevation, but with the valve in its closed instead of open position;

Fig. 10 is a sectional elevation of switch mechanism forming part of the controls of the operating mechanism;

Fig. 11 is a sectional elevation of a part of the armature and some of the contact mechanism;

Fig. 12 is a sectional elevation of a part of the operating mechanism, and showing details of some of the electrical connectors;

Fig. 13 is a similar, sectional elevation through another part of the valve operating mechanism;

Fig. 14 is a plan of the armature;

Fig. 15 is a diagram illustrating the connections and circuit arrangements of the device; and Fig. 16 is a sectional elevation through a modified valve, which may be used in substitution for the type shown in Figs. 3 and 4.

In the illustrated embodiment of the invention, the operating mechanism may be largely included in a casing 1 (Figs. 1 to 4), which is secured in any suitable manner to the casing of a valve 2 of any suitable construction, the valve having a seat 3 for engagement by a valve element 4. The valve seat 3 may be provided in a partition 5 extending across the interior of the valve casing, so that the passage in the partition 5 forming the valve seat controls communication between the pipes 6 and 7 which are connected to the valve casing at opposite sides of the partition 5. The valve element 4 may comprise a ball having a stem 8 extending therefrom and slidably mounted in a passage 9 in the casing, the stem extending into the casing 1. The casing 1 may be detachably secured to the valve casing if desired, by a flanged ring 10 threaded to the valve casing and having an inturned flange engaging and clamping a flanged portion of the casing 1, against a suitable part of the valve casing, as shown clearly in Figs. 3 and 4.

The casing 1, if desired, may include an upper plate 11, and a lower plate 12, with an interposed tubular or cylindrical shell 13, there being gaskets 14 between the ends of the shell 13 and the plates 11 and 12 so as to tightly seal the joints between the shell and the plates. The valve stem 8, after extending into the casing 1, is provided with a reduced portion 15 which carries an armature or magnetic bar 16, the bar fitting against a shoulder on the stem at the beginning of the reduced portion 15, and being secured against movement thereon in any suitable manner, such as by a pin 17 which passes through the reduced portion 15 to confine the armature against the shoulder.

Electromagnetic coils 18 are secured endwise against the underside of the upper plate 11 at one side of the armature or bar 16, and similar coils 19 are secured to the lower plate 12, so as to extend endwise toward the upper coils 18, but on the opposite side of the armature 16, so that the armature will be disposed between the two sets of electromagnetic coils and be movable between these sets of coils as the valve element 4 moves between open and closed positions, as shown in Figs. 3 and 4. The coils 18 and 19 may be secured respectively to plates 11 and 12 by suitable screws from the cores entering the plates, and the plates 11 and 12 are preferably of magnetic material, so as to form a connecting flux path between the adjacent core ends of the coils to which they are connected, each set of coils and its connecting plate together forming a horse-shoe magnet, with the horse-shoe magnets disposed on opposite sides of the armature. The armature is in the magnetic field of both electromagnets and tends to complete the flux path between the free ends of both horse-shoe magnets. I have found that by the use of the horse-shoe magnets in this manner, a more satisfactory and greater magnetic pull on the armature is obtained.

A strip 20 of non-magnetic material, such as brass, is bent generally into the form of a U, so as to provide standards or legs extending along opposite sides of one of the electromagnetic coils 19, then along the path of movement of opposite edges of the armature 16, then across between the coils 18 to form the cross part 21 of the U of the strip, the cross part being also laterally offset as at 22, so as to extend between the coils 18. The free arms of the strip 20 are secured to the plate 12 in any suitable manner, and the cross part 21 receives and slidingly mounts the reduced end 15 of the valve stem. The portions of the two side arms of the strip which extend along the opposite edges of the armature 16 may be offset inwardly, that is toward one another somewhat, so as to form guiding walls for the armature 16 as the latter moves with the valve stem. This offsetting is provided when the armature is narrower than the diameter of the coils 19.

A pair of levers 23 and 24, Figs. 6 to 9, are pivoted by pins 25 and 26, respectively, upon an upstanding bracket arm 27, with arms of the two levers overrunning one another and interconnected such as by a pin and slot connection. For example, the lever 23 may carry a headed pin 28 which slides in a slot 29 provided in the overrunning arm of the lever 24. This pin and slot connection between the levers causes their concomitant oscillation. The free ends of the levers 23 and 24 are connected by a coil spring 30 which tends to draw the free ends of the levers toward one another, and thus to bias the levers yieldingly in one direction or the other from a dead center or intermediate position.

The connection of the spring to one of the levers, such as the upper lever 24, is preferably at a point materially to one side of a theoretical line joining the pivot 26 of that lever, and the point of connection between the levers. This result may conveniently be obtained by making the lever 24 a bell crank, with the free arm to which the spring is connected extending away from the armature. The arm of the lever 23 to which the spring is connected, is preferably considerably longer than the other arm of the same lever, and longer than either arm of the lever 24, so that as the levers oscillate between the positions shown in Figs. 8 and 9, the movement of the lower end of the spring which is connected to the lever 23 will be largely horizontal and not to any great extent in a vertical direction.

By reason of the offset of the point of connection of the spring to the lever 24, as by making the lever 24 a bell crank, the movement of the point of the lever 24 to which the spring 30 is connected will be to a considerable extent in a vertical direction, that is, generally in the direction of movement of the armature. Thus the tension of the spring will be considerably modified or varied by the changes in positions of the levers from those shown in Fig. 8 to those in Fig. 9.

One of the levers, such as 23, is provided in a side edge, at a point transversely of the lever at approximately the pivot 25, with an undercut notch 31 which rockably embraces an edge portion of the armature 16, so that as the armature and valve stem move back and forth between open and closed positions, the levers 23 and 24 will oscillate between the positions shown in Figs. 8 and 9. By reason of the undercut notch the rocking of the armature in the notch may occur without any material lost motion or play between the armature and the lever 23, and without binding of the armature in the notch. It will be noted, in Fig. 9, that the spring is considerably to the left of both of the pivots 25 and 26 of the interconnected levers 23 and 24, and therefore the turning force of the spring upon the levers would be considerable were it not for the fact that the end of the lever 24 to which the spring is connected has moved in the direction of movement of the armature, that is, toward the lever 23, for a considerable extent, so that the spring 30 is greatly relaxed in tension.

As the armature starts its upward movement, the tension of the spring 30 will increase rapidly, because of the bell crank formation of the lever 24, and the spring will cross the axis of the pivot 25 of the lever 23 before it reaches the axis of the pivot pin 26 of the lever 24. In fact, as will be seen from Fig. 8, the spring never passes the axis of the pin 26, but closely approaches it as the armature reaches its upper limit of movement. With this arrangement, the spring is at approximately its maximum tension as it passes the pivot 25, but since it is still pulling in the same direction upon the lever 24 and in the opposite direction upon the lever 23 as soon as it passes the axis of the pin 25, the spring 30 will tend to rotate the two levers in opposed directions.

Since the arm of lever 23 to which the spring 30 is connected is considerably longer than the corresponding arm of the lever 24 to which the spring is connected, the net result is that there will be greater turning effort upon the lever 23 than upon the lever 24, and therefore the two levers will be biased yieldingly into the position shown in Fig. 8, thus yieldingly holding the armature in its upper position. The pull of the spring on both levers is at this time very close to both pivots 25 and 26, and therefore the force necessary to turn the levers to carry them from the position shown in Fig. 9 will be very small, because the movements of the ends of the spring will be largely lateral, and very little increase in tension will be given to the spring in carrying it past the dead center position.

As soon as the spring passes the dead center position, however, the spring 30 will act upon both levers to rotate them in unopposed directions, that is, in directions in which both may move freely in view of their interconnection to one another, and as this movement increases, the tension of the spring will be greatly relaxed, as hereinbefore explained. It will be further noted that the spring is relaxed to the greatest extent when the valve is in closed position at which time the fluid pressure on the valve element tends to hold it seated.

There is a considerable load in starting the valve element to open position, in overcoming the fluid pressure on the valve, and therefore it is advantageous to have the spring relaxed in tension as much as possible when the armature starts its opening move. The magnetic pull is always less at the start of a movement, and increases as the armature approaches its magnets, so that as the opening movement proceeds, the magnetic pull becomes stronger, the fluid pressure will be more nearly equalized on both sides of the valve element, and the magnetic operating means can then more readily move the armature against a stronger spring. With this arrangement, the resistance offered by the spring to the starting opening movement will be a minimum, and will only increase as the magnetic pull increases by the approach of the armature to the electromagnet.

A common stem or rod 32 is mounted in the casing 1, such as by threading it into the lower plate 12 within the shell 13, as shown in Fig. 10, and this rod or stem is preferably threaded throughout its length. Upon this rod or stem and adjacent its ends I provide a plurality of nuts 33. Between pairs of these nuts, suitable spring contact blades 34 are clamped, suitable insulating washers and bushings 35 being disposed on both sides of each contact blade and through the aperture in the same, so as to completely insulate the contact blade from the rod or stem 32. A terminal connector plate 36 is also clamped on the rod or stem against each contact blade and insulated from the stem or rod 32 by the insulating washers or bushings 35. The two contact blades will thus be insulated from and securely clamped on the common rod or stem 32, and at the same time the blades and their circuit connector plates 36 may be adjusted to different positions along the rod or stem 32 by merely adjusting the clamping nuts along the rod or stem.

The free ends of the contact blades 34 extend along the rod or stem in the direction of movement of the armature, and along a side edge of the armature, and each blade carries a contact button 37 at a point to be engaged by an edge of the armature as the armature approaches one of its limits of movement. That is, the buttons 37 are in such positions that the armature edge will engage with one button as it approaches one limit of movement, and will engage the other button as it approaches the other limit of movement. The contact portions of the buttons and armature edges are preferably made correspondingly oblique, so that a good area of contact will be obtained at each time the armature engages one of the buttons, as well as a wiping contact. The contact blades 34 are disposed side by side and overrun one another, so that the buttons 37 will engage with different edge portions of the armature, and therefore the oblique portion of each button and cooperating part of the armature edge will be oppositely oblique to those of the other button and its cooperating part of the armature edge.

The movement of the spring blades into the path of the armature may be limited in any suitable manner, such as by insulated stops 39 which are disposed in the path of the free ends of the spring blades so as to limit the movement of the blades toward the armature path, and these insulators 39 may be mounted in any suitable manner, such as by mounting them upon the stem or rod 32 and clamping them between nuts 40 provided for that purpose on the stem or rod 32. The insulators, however, are out of the path of travel of the armature.

Referring particularly to Fig. 15, the two upper electro-magnet coils 18 which move the armature in a valve opening direction are connected in parallel to one another, so as to obtain a maximum of magnetic pull upon the armature. One end of these parallel-connected coils 18 is connected by a wire 41 to a terminal screw or connector 42 which passes through and is insulated from the upper plate 11, the connector screw carrying at its outer end a connector plate 43 to which a circuit wire 44 may be connected. The other end of the coils 18 is connected to the upper spring contact blade 34, and the contact button 37 of this upper blade is disposed in position for engagement by the armature as the latter moves away from the coils 18 and under the attraction of the coils 19.

The coils 19 are connected in series to one another, one end of these series connected coils being connected to the lower spring contact blade 34 whose contact button 37 is in position for engagement by the armature 16 as the latter approaches its upper limit of movement under the attraction of the coils 18. The other end of the series connected coils is connected by wire 45 to a terminal connector screw 46, which passes through and is insulated from the upper plate 11, and this terminal screw carries a terminal plate or connector 47 to which is connected a circuit wire 48. The armature is grounded through the valve stem and valve, and also through parts engaging the armature and valve stem.

The actuating current may be supplied by circuit mains 49, the current therefrom being reduced in voltage by the transformer 50. One terminal of the transformer is directly grounded to the frame 11 by wire 51, and the other terminal of the transformer is connected by wire 52 to one side of a controlling switch 53, the other side of the controlling switch being connected to the wire 48 leading to the connector screw 46. The wire 52 is also connected to one side of another switch 54, the other side of that switch being connected by the wire 44 to the terminal screw 42. By closing the switch 54, which may be called the "on" switch, a circuit will be established from the transformer through wire 52, the switch 54, wire 44, terminal screw 42, wire 41, coils 18, the upper spring contact blade 34, the armature 16, the grounded frame 11, and wire 51 back to the transformer.

Upon the completion of such a circuit, the electromagnets 18 will be energized and will attract the armature 16 moving it from the lower position in Fig. 9, upwardly to the position shown in Fig. 8, thus opening the valve and shifting the levers 23 and 24 into the position shown in Fig. 8. As the armature moves upwardly for this purpose, it will move out of contact with the spring blade 34 with which it has been engaged, and break the circuit just described. As the armature moves upwardly, however, it will engage with the lower spring contact blade 34, so that if now the "off" switch 53 is closed, a circuit will be established as follows: from the transformer through wire 52, switch 53, wire 48, terminal screw 46, wire 45, coils 19, lower spring contact blade 34, armature 16, grounded frame 11 and wire 51 back to the transformer. This circuit will cause a downward pull upon the armature through the coils 19 which are now energized, and consequently the valve element and armature will be moved into closed position.

In order that one may know when the valve is in "on" position, a signal light 55 may be provided adjacent each switch 53, and connected in parallel across the switch, so that when the armature and the valve are in "on" position and the circuit through the coils 19 is established by the armature and the lower contact blade 34, the light 55 will be in series with the coils 19, so long as the switch 53 remains open. The light 55 will therefore be visible so long as the valve element and the armature are in their upper or open position. The resistance of the light 55 and of the coils 19 which are in series with one another is sufficiently high to keep the current consumption to a minimum and prevent the building up of magnetic pull sufficient to attract the armature 16. However, as soon as the switch 53 is closed, it will shunt the light 55 and thereby cut out the resistance in the circuit which was offered by the light 55. With this decrease in resistance in the circuit, and the voltage of course remaining the same, the current flow will be greatly increased, and this increased current flow is sufficient to set up a magnetic field of a strength that will attract the armature 16 and move the valve element into closed position. As many "on" and "off" switches and signal lights may be provided as desired, and corresponding switches will all be connected in parallel but arranged in different rooms or in different parts of a dwelling. Such additional switches and lights are shown in dash lines in Fig. 15.

It is possible that one having operated one of the switches 54 to cause the operation of the valve element to "on" position may forget the matter and not be in a position to observe the light 55 which would then be burning. To prevent the operation of a burner (not shown) controlled by the valve beyond a time which would be sufficient to heat a desired quantity of water, a suitable thermostatic arrangement may also advantageously and preferably is used as a part of this system. For example, any suitable thermostatically operated switch device 56 may be mounted adjacent to or at any point along a hot water storage tank or reservoir 57, and connected by circuit wires 58 and 59 to the circuit wires 52 and 48 respectively. This places the thermostatic switch 56 electrically in parallel with the light 55 and the switch 53.

When the burner has operated for a period of time sufficient to heat the water in the tank 57 down to the thermostatic switch 56, the latter being then heated will close the circuit between the wires 58 and 59 and thus will shunt the light 55 the same as would be done by the switch 53. This causes a sufficient energization of the magnets 15 to cause the operation of the valve element to "off" position, thus shutting off the burner automatically when the desired quantity of water has been heated, even though the person who started the burner going had forgotten that fact or did not see the signal light. However, anyone may shut off the burner, by operating the switch 53, at any time before the entire quantity of water has been heated. Inasmuch as the quantity of water desired to be heated before the burner is automatically cut off may vary at different times, the thermostatic switch device 56 may be mounted on a band 60 which surrounds the tank and is adjustable upwardly and downwardly on the tank into any desired position, the particular position selected determining the amount of water to be heated before the burner will be automatically cut off by the closing of the valve.

It may be desirable to keep the water hot after the burner has been cut off by the closing of the valve either manually or automatically, and in such a case a screw 61 may be threaded through the casing of the valve 2 in a position to obstruct the complete closing of the valve element 4, as shown clearly in Fig. 4. The screw prevents complete movement of the valve element into closed position and by threading it into the casing of the valve to different extents, the valve element may be held in a more or less slightly open position, so as to permit the flow of a small quantity of gas to the burner and thus keep the burner going but with a very low flame. This flow is sufficient to keep the water hot after the valve element has closed.

Instead of the screw 61, as shown in Figs. 3 and 4, a suitable by-passage 62 may be provided in the partition 5 at one side of the main passage or valve seat 3 (see Fig. 16), and this auxiliary passage 62 may be restricted more or less by the conical tip of a screw 63 which is also threaded through the casing of the valve 2ª. Thus by threading the screw 63 further into the casing, the flow through the auxiliary passage 62 may be cut down, so that the extent to which the burner may be supplied with gas may be varied in the same manner as the minimum flow is regulated by the screw 61 in Figs. 3 and 4.

The connector screws 42 and 46 which pass through the plate 11 are insulated from the plate 11 in any suitable manner, such as by insulated washers 64 and flanged bushings 65, Figs. 12 and 13. In order to prevent turning of the screws 42 and 46, such as might be caused by the tightening or loosening of the nuts 66 thereon and through which the connector plates 43 are clamped thereto, the portion of each connector screw 42 and 46 which passes through the plate 11 and the bushings 65 may be made non-circular in form, such as by making it of square cross section, and the bushings 65 is made similarly non-circular both inside and outside. The non-circular bushing is seated in a non-circular aperture in the upper plate 11. Thus neither of the screws 42 or 56 can be turned by the tightening or loosening of the nuts 66, and therefore any danger of twisting the wires 41 and 45, such as might cause their breakage will be prevented. The wire 41 is connected to both coils 18, and this double connection may be easily established by passing the wire 41 through an aperture or passage in the head of the terminal screw 42, as shown in Fig. 12, and soldering the wire therein to establish a good contact.

The operation of this system will be readily understood from the foregoing, but will be stated briefly. The circuit through each horse-shoe electromagnet will be established at the valve as the armature approaches its retracted position with respect to that electromagnet, and as moved by the opposite electromagnet. By selectively operating the switches 53 and 54, the valve element may be operated from a remote point to either open or closed position, and when the valve element moves into open position so as to start the burner of the water heater, a circuit will be established through the coils 19 and all the signal lights 55, which signal lights will be in parallel to one another although collectively in series with the coils 19, and these signal lights will indicate that the burner is going. If, however, one should forget that the burner is going, or not see any of the signal lights burning, the thermostatic switch device 56 will automatically cause the closing of the valve element and the shutting down of the burner when a predetermined quantity of water has been heated. The minimum flow of gas controlled by the valve while the valve is in closed position, may be varied by adjusting the screw 61 or the screw 63, depending upon the type of valve employed. It will also be observed that the armature makes a wiping contact with the contact buttons 37 of the spring blades 34, and therefore a dependable and clean contact surface will always be provided within the casing 1, where access is not convenient. The casing 1 being a closed casing, it is not necessary to have a tight fit between the stem 8 of the valve element and the passage 9, and therefore there will be a minimum of resistance to movement of the valve element between its positions.

It will be obvious that various changes in the details, which have been herein described and illustrated in order to explain the nature of the invention, may be made by those skilled in the art within the principle and scope of the invention as expressed in the appended claims.

I claim as my invention:—

1. In an electric operating system for valves, a valve, a bar armature connected to said valve, a pair of horse-shoe electromagnets disposed on opposite sides of said armature, with the armature extending between the free ends of the electromagnets and always moving in the magnetic field of both electromagnets, whereby said armature and valve will be operated in one direction or the other depending upon which electromagnet is energized, a circuit for each electromagnet, a pair of switches in series in each circuit, one of the switches in each pair being closed by the movement of the armature away from the related magnet in whose circuit that switch is connected, the other of such switches of each circuit when closed causing an operation of the valve.

2. In an electric operating system for valves, a valve having a movable element, an armature carried by said element, electromagnets for operating said armature in either direction, a separate circuit for each electromagnet including the armature as a part of both circuits, a pair of spring contacts, one connected in series to each of said electromagnets and each engageable with the armature to complete the circuit through its electromagnet, the points of engagement of the armature with the spring contacts being approximately at the ends of movements of the armature away from the magnet whose circuit is completed by a spring contact, and an additional switch in each circuit for controlling the initiation of the action of the electromagnets.

3. In an electric operating system for valves, a valve having a moving element whose position determines whether the valve is opened or closed, a bar armature connected to said valve element to operate it between open and closed positions, a pair of spring contact blades disposed adjacent the armature, each blade and armature having surface portions engageable with one another during the movement of said armature between open and closed positions, said engageable surface portions being oblique to the direction of travel of the armature, said surface portions of said armature being oppositely oblique to the direction of travel of the armature, whereby as the armature bar moves in opposite directions, it will engage and have wiping contact with one or the other of said spring contacts at approximately the ends of its movement, a circuit for each electromagnet including said armature bar and that one of said blades with which said bar engages as it moves away from this electromagnet, whereby the circuit through any electromagnet will be opened whenever the armature approaches that electromagnet.

4. In an electrically operated system for valves, a valve element movable between open and closed position, an armature connected to said element for operating the same, said armature having contact surfaces oppositely oblique to its direction of travel, spring contact blades having oblique faces corresponding respectively in obliqueness of contact surfaces with the oblique surfaces of said armature and disposed for engagement alternately by said armature contact surfaces at approximately the limits of its movements in both directions, electromagnets operating on said armature to operate it selectively in either direction, and operating circuits for said electromagnets, each circuit including in series one of said spring contacts, both including said armature.

5. In an electric operating system for valves, a casing having a valve seat, a valve element in said casing and having a stem slidable in said casing to permit movement of the valve element to and from closed position on said seat, an armature bar secured on said stem so as to extend transversely thereof, a pair of horseshoe electromagnets arranged on opposite sides of said bar, with the bar between said electromagnets and movable toward or from said electromagnets alternately as the valve element moves between open and closed positions, an individual operating circuit for each electromagnet, and means engaging the armature for yieldingly holding it at both of its limits of movement between said electromagnets.

6. In an electric operating system for valves, a valve casing having a seat, a valve element in said casing and having a stem slidable through said casing to and from closed position with respect to said seat, a second casing secured to the valve casing and into which said stem extends, a bridge member within said second casing and slidingly supporting and guiding said stem, an armature bar secured on said stem and extending in opposite directions transversely of the stem at a point within said second casing, electromagnets arranged upon opposite sides of said armature bar and between which said bar moves as the stem reciprocates between open and closed positions, an individual circuit for each electromagnet, and means for yieldingly holding said valve stem and armature in open position.

7. In an electric operating system for valves, a valve casing having a seat, a valve element in said casing and having a stem slidable through said casing to and from closed position with respect to said seat, a second casing secured to the valve casing and into which said stem extends, a bridge member within said second casing and slidingly supporting and guiding said stem, an armature bar secured on said stem and extending in opposite directions transversely of the stem at a point within said second casing, electromagnets arranged upon opposite sides of said armature bar and between which said bar moves as the stem reciprocates between open and closed positions, an individual circuit for each electromagnet, and means for yieldingly holding said valve stem and armature in open position, said bridge member also having portions extending along the sides of the armature bar throughout the range of movement of the bar, for guiding the bar and preventing it from turning on said stem in a manner to leave the direct magnetic field of said electromagnets.

8. In an electric operating system for valves, a valve element movable between open and closed positions and having a stem movable endwise as said element moves between open and closed positions, an armature bar connected to said stem, electromagnetic means acting on said armature bar to operate it in opposite directions and through it operate said valve element, a pair of levers pivotally mounted adjacent the armature bar and having a pin and slot connection to one another, whereby they will oscillate concomitantly, a spring connected between the free ends of said levers on opposite sides of the pivots of the levers, so as to yieldingly urge the levers to one side or the other of a dead center position, one of said levers having an undercut notch in a side edge rockably embracing said armature bar and stem whereby the operation of said armature bar and stem between open and closed positions will cause movement of said levers past dead center position at an intermediate point during the travel of said armature bar in either direction, whereby said spring will yieldingly hold said armature bar and stem at both limits of movement.

9. In an electric operating system for valves, a valve element movable between open and closed positions and having a stem movable endwise as said element moves between open and closed positions, an armature bar carried on said stem, electromagnetic means acting on said armature bar to operate it in opposite directions and through it operate said valve element, a pair of levers pivotally mounted adjacent the armature bar and having a pin and slot connection to one another, whereby they will oscillate concomitantly, a spring connected between the free ends of said levers on opposite sides of the pivots of the levers, so as to yieldingly urge the levers to one side or the other of a dead center position, one of said levers having a connection to said armature bar and stem whereby the operation of said armature bar and stem between open and closed position will cause movement of said levers past dead center position at an intermediate noncentral point during the travel of said armature bar in either direction, whereby said spring will yieldingly hold said armature bar and stem at both limits of movement, the arrangement of said spring between said levers with respect to the pivots of those levers being such that the spring actions are non-symmetrical whereby when the armature bar moves into open position the levers will pass dead center position while nearer the open position than the closed position.

10. In an electric operating system for valves, a valve element mounted for reciprocation between open and closed positions, an armature carried by said valve element, electromagnetic means operating on said armature to move it and said element in opposite directions between said positions selectively, a pair of levers pivotally mounted adjacent said armature and having a pin and slot connection to one another, whereby said levers will oscillate concomitantly, one of said levers having a cam connection to said armature, whereby said levers will oscillate concomitantly with the movements of said armature and element, a spring connecting said levers in a manner to cause movement of said levers to one side or the other of a dead center position, whereby said levers and armatures will be yieldingly biased for movement toward both limits of movement, the pivots of said levers and the spring connection between said levers being so arranged relatively to one another that the dead center line is passed at a point nearer the limit of movement of the valve element toward open position than toward closed position, whereby said spring will exert a greater bias on said valve element tending to move it into closed position than into open position.

11. In an electric operating system for valves, a valve element having a stem mounted for reciprocation between open and closed positions, an armature carried by said stem and extending transversely therefrom, horse-shoe electromagnets disposed on opposite sides of said armature, so as to shift said armature and element in either direction between open and closed positions depending which electromagnet is effective upon said armature, the coils of that electromagnet tending to move said armature and valve element toward open position being connected in parallel to one another, the coils of the electromagnet tending to move the armature into closed position being connected in series to one another, an electric circuit for each electromagnet including a main controlling switch for each circuit, a signal lamp connected in parallel across the switch controlling the electromagnet which closes the valve, so as to be in series with the coils of that electromagnet when the switch of that circuit is in open position, a resilient device connected to said armature and valve element for yieldingly biasing said valve element in both directions from an intermediate position, the bias being greater toward the closed than towards the open position, and a switch in the circuit of each electromagnet closed by the movement of the armature away from that electromagnet.

12. In an electric operating system for valves, a valve casing, a valve element in said casing having a valve stem mounted for reciprocation in said casing, an armature carried by said stem, electromagnets disposed on opposite sides of said armature and operating it between open and closed positions depending upon which electromagnet is energized, a pair of levers pivotally mounted adjacent the armature and having arms extending toward one another and overrunning, said overrunning arms having a pin and slot connection with one another, whereby they are oscillated concomitantly, one of said levers having a connection to said armature, whereby said armature and lever will move concomitantly, a spring connected between the free ends of said levers so as to bias said levers in either direction from an intermediate dead center position, the point of connection of said spring to one of said levers being materially at one side of a theoretical line joining the pivot of that lever with the point of connection between said levers, whereby said spring crosses the pivotal axis of one lever before it will the other during movement of the armature in one direction.

13. In an electric operating system for valves, a valve stem, an armature carried by said valve stem and extending laterally therefrom, electromagnets disposed on opposite sides of said armature and operating said armature and valve stem in either direction between open and closed positions depending upon which electromagnet is energized, an individual circuit for each electromagnet, a spring blade included in the circuit of each electromagnet and having a contact portion engageable by the armature as the armature moves away from the electromagnet in whose circuit the blade is included, a rod, said spring blades being mounted upon said rod for individual adjustment in the direction of travel of the armature, whereby the instant of contact of the armature and spring blades may be varied by adjustment of the blades.

14. In an electric operating system for valves, a valve element having a valve stem by which it may be operated between open and closed positions, an armature carried by said stem, electromagnets disposed on opposite sides of said armature for magnetically moving said armature and valve stem alternately between open and closed positions, depending upon which electromagnet is energized, a rod adjacent to said armature and extending in the direction of movement of said armature, a pair of spring blades mounted on said rod for adjustment along the same and extending in close proximity to an edge of the armature for engagement therewith as the armature approaches the limits of movements in both directions, the armature engaging one of said blades when approaching one of its limit positions and engaging with the other when approaching the other limit position, means also mounted on said rod for limiting the movement of said blades toward the armature, whereby said spring blades will not contact with said armature until the armature approaches its limits of movements, individual circuits for said electromagnets, the circuit of each electromagnet including in series therein the spring blade engaged by the armature as it moves away from that electromagnet, and means for yieldingly biasing the armature and stem toward either limit of movement from an intermediate position.

15. In an electric operating system for valves, a valve casing, a valve element in said casing having a valve stem mounted for reciprocation in said casing, an armature carried by said stem, electromagnets disposed on opposite sides of said armature and operating it between open and closed positions depending upon which electromagnet is energized, a pair of levers pivotally mounted adjacent the armature and having arms extending toward one another and overrunning, said overrunning arms having a pin and slot connection with one another, whereby they are oscillated concomitantly, one of said levers having an undercut notch in its edge at a point transversely of that lever near its pivot, said armature being rockably received in said notch, whereby said notched lever and armature will always move concomitantly, during which the armature rocks and slides in said notch, and a spring connected between the free ends of said levers to bias said levers in either direction from an intermediate dead center position.

16. In an electric operating system for valves, a valve element movable between open and closed positions, a bar armature connected to said element for movement therewith, electromagnets acting upon said armature to operate it and said element between open and closed positions, the direction depending upon which electromagnet is energized, a pair of levers pivotally mounted adjacent the armature and extending generally in the direction of movement of the armature, said levers having adjacent arms interconnected for concomitant oscillation, one of said levers having in its edge, transversely thereof opposite its pivot, an undercut notch rockably embracing said armature, whereby the levers will be oscillated when the armature moves, and a spring connected between the free arms of said levers, one of the arms to which the spring is connected being materially longer from the spring connection to its pivot than the spring connection to the other lever is from the pivot of that other lever, the point of connection of said spring to the short arm being materially at one side of a theoretical line joining the pivot of that lever with the point of connection between said levers, whereby the spring crosses the pivotal axis of one lever before it will that of the other lever, during movement of the armature in one direction.

17. An electrically operated valve comprising a valve element mounted for movement between open and closed positions, an armature connected to said element for movement therewith in both directions, a pivoted lever having in its edge adjacent its pivot a notch rockably engaging a portion of the armature, and a spring device acting on said lever to bias it in either direction from an intermediate position, whereby said lever and armature will be yieldingly held in either open or closed position.

18. In an electrically operated valve, a valve casing, an auxiliary casing connected to said valve casing, a valve element in said valve casing having an operating stem extending into said auxiliary casing and movable between open and closed positions, an armature in said auxiliary casing, an electromagnet disposed adjacent said armature and operable thereon to move the same and said valve element into open position, a second electromagnet disposed adjacent said armature and operable thereon to move the armature and valve element into closed position, a stud extending into said auxiliary casing, a lever pivoted on said stud with the pivotal axis in approximately the plane of the armature when the armature is at an intermediate point in its movement between said electromagnets, said lever having in the edge adjacent said armature a notch rockably embracing a portion of the armature to cause concomitant movement of said armature and lever, and a spring device acting upon said lever and yieldingly biasing it in either direction from an intermediate position through which said lever passes as the armature moves between open and closed positions, whereby the armature and valve element will be yieldingly held in either open or closed position.

19. An electrically operated valve comprising a valve element mounted for movement between open and closed positions, an armature connected to said element for movement therewith in both directions a pivoted lever having in its edge adjacent its pivot a notch rockably engaging a portion of the armature, and a spring actuated cam device acting on said lever to bias it in either direction from an intermediate position, whereby said lever and armature will be yieldingly held in either open or closed position.

20. In an electric operating system for valves, a valve element mounted for reciprocation between open and closed positions, an armature carried by said valve element, electromagnetic means operating on said armature to move it and said element in opposite directions between said positions selectively, a pair of levers of the first class pivotally mounted adjacent said armature and having a pin and slot connection to one another, whereby said levers will oscillate concomitantly, one of said levers having a cam connection to said armature adjacent its pivot, said cam connection being independent of the other lever, whereby said levers will oscillate concomitantly with the movements of said armature and element, said one of the levers having its free arm longer than its connected arm, a spring connecting the free end of the other of said levers and the free end of the longer arm of said one of the levers to cause movement of said levers to one side or the other of a dead center position, whereby said levers and armatures will be yieldingly biased for movement toward both limits of movement.

HENRY L. STEPHENSON.